(12) United States Patent
Kesselmans et al.

(10) Patent No.: US 6,596,860 B1
(45) Date of Patent: Jul. 22, 2003

(54) ADHESIVE COMPOSITION

(75) Inventors: Ronald Peter W. Kesselmans, Annen (NL); Ido Pieter Bleeker, Ten Boer (NL); Willem Kamminga, Zuidbroek (NL)

(73) Assignee: Cooperatieve Verkoop-en Productievereniging van Aardappelmeel en Derivaten AVEBE B.A., Ja Veendam (NL)

( * ) Notice: Subject to any disclaimer, the term of this patent is extended or adjusted under 35 U.S.C. 154(b) by 0 days.

(21) Appl. No.: 09/743,400

(22) PCT Filed: Jul. 19, 1999

(86) PCT No.: PCT/NL99/00459

§ 371 (c)(1),
(2), (4) Date: Mar. 12, 2001

(87) PCT Pub. No.: WO00/05319

PCT Pub. Date: Feb. 3, 2000

(30) Foreign Application Priority Data

Jul. 23, 1998 (EP) .............................................. 98202489

(51) Int. Cl.$^7$ .......................... C08B 31/00; C08B 31/02; C08B 31/06; C09J 103/04; C09J 103/00
(52) U.S. Cl. .................... 536/106; 536/123.1; 536/102; 536/107; 536/110; 536/47; 536/128; 536/4.1; 106/206.1
(58) Field of Search ................................. 536/1.11, 4.1, 536/106, 123.1, 128, 102, 47, 107, 110; 106/206.1

(56) References Cited

U.S. PATENT DOCUMENTS

| | | | |
|---|---|---|---|
| 3,950,593 A | | 4/1976 | Bomball et al. |
| 4,014,727 A | | 3/1977 | Musselman et al. |
| 5,085,228 A | * | 2/1992 | Mooney et al. |
| 5,087,649 A | * | 2/1992 | Wegner et al. |
| 5,403,871 A | | 4/1995 | Eden et al. |

FOREIGN PATENT DOCUMENTS

| | | |
|---|---|---|
| EP | 0 458 233 A2 | 11/1991 |
| EP | 0 799 837 A2 | 10/1997 |
| EP | 0 852 235 A2 | 7/1998 |
| WO | WO 97/43225 | 11/1997 |

* cited by examiner

*Primary Examiner*—Samuel Barts
*Assistant Examiner*—Michael C. Henry
(74) *Attorney, Agent, or Firm*—Hoffmann & Baron, LLP

(57) ABSTRACT

The invention relates to an adhesive composition comprising a derivative of a starch, which comprises at least 95 wt. % of amylopectin, based on dry substance of the starch, wherein the derivative is obtainable by cross-linking, etherification, esterification or a combination thereof, of the starch. The invention further relates to a process for preparing the adhesive composition and to the use thereof for adhering wallpaper or billposter to a substrate.

12 Claims, No Drawings

ABSTRACT COMPOSITION

ADHESIVE COMPOSITION

BACKGROUND OF THE INVENTION

The invention relates to an adhesive composition for wallpaper and the like.

Adhesive compositions for wallpaper are mostly based on cellulose derivatives, such as methylcellulose, methylhydroxypropylcellulose, hydroxyethylcellulose, and carboxymethylcellulose, and/or starch derivatives, such as carboxymethylated or hydroxyalkylated starch. The compositions are usually marketed in dry form, e.g. in flake or granulate form, and are formulated into an aqueous paste just before use.

In order to develop a suitable adhesive composition for wallpaper and the like, several factors are to be taken into account. It is desired that the composition, in the dry form wherein it is purchased, can easily be formulated in an aqueous paste. The aqueous paste should have sufficient adhesive strength for a sheet of wallpaper to adhere to a substrate surface when said sheet is applied thereto. Further, the drying time of the composition should not be too long or too short. Also, after drying, the composition should have sufficient adhesive strength to hold the wallpaper into place. However, the adhesive strength after drying should not be too high. It often occurs that a once applied layer of wallpaper is to be removed so that a fresh layer, for instance a wallpaper having a different design, can be applied.

It is an object of the invention to provide an improved adhesive composition for wallpaper, billposters and the like, which meets all the above requirements.

Surprisingly, it has been found that the incorporation of a derivative of a starch having a high amylopectin content into an adhesive composition for wallpaper and the like bestows highly advantageous properties upon said composition. Thus, the invention relates to an adhesive composition comprising a derivative of a starch, which starch comprises at least 95 wt. % of amylopectin, based on dry substance of the starch, wherein the derivative is obtainable by crosslinking, etherification, esterification, or a combination thereof, of the starch.

A great advantage of an adhesive composition according to the invention is that it contains significantly smaller amounts of salts, which are by-products of the preparation of the composition, than conventional adhesive compositions based on starch. This is particularly advantageous in that the presence of salts may lead to staining of wallpaper, that is being adhered to a surface using the adhesive composition. Also, in comparison with adhesive compositions for wallpaper based on derivatives of conventional starches, which comprise at least 10 wt. % based on dry substance of the starch of amylose, a larger surface of wallpaper can be adhered to a substrate using an adhesive composition according to the invention. In addition, it has been found that wallpaper applied to a substrate using the present adhesive composition can be easily removed, for instance when it is desired to apply a fresh layer of wallpaper to the same substrate, while the adhesive strength of the dry composition is high enough to prevent the wallpaper from releasing itself from the substrate after a certain period of time.

As has been indicated above, an adhesive composition according to the invention, is based on a starch which has a very high amylopectin content. Most starch types consist of granules in which two types of glucose polymers are present. These are amylose (15–35 wt. % on dry substance) and amylopectin (65–85 wt. % on dry substance). Amylose consists of unbranched or slightly branched molecules having an average degree of polymerization of 1000 to 5000, depending on the starch type. Amylopectin consists of very large, highly branched molecules having an average degree of polymerization of 1,000,000 or more. The commercially most important starch types (maize starch, potato starch, wheat starch and tapioca starch) contain 15 to 30 wt. % amylose.

Of some cereal types, such as barley, maize, millet, wheat, milo, rice and sorghum, there are varieties of which the starch granules nearly completely consist of amylopectin. Calculated as weight percent on dry substance, these starch granules contain more than 95%, and usually more than 98% amylopectin. The amylose content of these cereal starch granules is thus less than 5%, and usually less than 2%. The above cereal varieties are also referred to as waxy cereal grains, and the amylopectin starch granules isolated therefrom as waxy cereal starches.

In contrast to the situation of different cereals, root and tuber varieties of which the starch granules nearly exclusively consist of amylopectin are not known in nature. For instance, potato starch granules isolated from potato tubers usually contain about 20% amylose and 80% amylopectin (wt. % on dry substance). During the past 10 years, however, successful efforts have been made to cultivate by genetic modification potato plants which, in the potato tubers, form starch granules consisting for more than 95 wt. % (on dry substance) of amylopectin. It has even been found feasible to produce potato tubers comprising substantially only amylopectin.

SUMMARY OF THE INVENTION

In the formation of starch granules, different enzymes are catalytically active. Of these enzymes, the granule-bound starch synthase (GBSS) is involved in the formation of amylose. The presence of the GBSS enzyme depends on the activity of genes encoding for said GBSS enzyme. Elimination or inhibition of the expression of these specific genes results in the production of the GBSS enzyme being prevented or limited. The elimination of these genes can be realized by genetic modification of potato plant material or by recessive mutation. An example thereof is the amylose-free mutant of the potato (amf) of which the starch substantially only contains amylopectin through a recessive mutation in the GBSS gene. This mutation technique is described in, inter alia, J.H.M. Hovenkamp-Hermelink et al., "Isolation of amylose-free starch mutant of the potato (*Solanum tuberosum* L.)", Theor. Appl. Gent., (1987), 75:217–221, and E. Jacobsen et al., "Introduction of an amylose-free (amf) mutant into breeding of cultivated potato, *Solanum tuberosum* L., Euphytica, (1991), 53:247–253.

Elimination or inhibition of the expression of the GBSS gene in the potato is also possible by using so-called antisense inhibition. This genetic modification of the potato is described in R. G. F. Visser et al., "Inhibition of the expression of the gene for granule-bound starch synthase in potato by antisense constructs", Mol. Gen. Genet., (1991), 225:289–296.

By using genetic modification, it has been found possible to cultivate and breed roots and tubers, for instance potato, yam, or cassave (Patent South Africa 97/4383), of which the starch granules contain little or no amylose. As referred to herein, amylopectin potato starch is the potato starch granules isolated from potato tubers and having an amylopectin content of at least 95 wt. % based on dry substance.

Regarding production possibilities and properties, there are significant differences between amylopectin potato starch on the one hand, and the waxy cereal starches on the other hand. This particularly applies to waxy maize starch, which is commercially by far the most important waxy cereal starch. The cultivation of waxy maize, suitable for the production of waxy maize starch is not commercially feasible in countries having a cold or temperate climate, such as The Netherlands, Belgium, England, Germany, Poland, Sweden and Denmark. The climate in these countries, however, is suitable for the cultivation of potatoes. Tapioca starch, obtained from cassave, may be produced in countries having a warm climate, such as is found in regions of South East Asia and South America.

The composition and properties of root and tuber starch, such as amylopectin potato starch and amylopectin tapioca starch, differ from those of the waxy cereal starches. Amylopectin potato starch has a much lower content of lipids and proteins than the waxy cereal starches. Problems regarding odor and foaming, which, because of the lipids and/or proteins, may occur when using waxy cereal starch products (native and modified), do not occur, or occur to a much lesser degree when using corresponding amylopectin potato starch products. In contrast to the waxy cereal starches, amylopectin potato starch contains chemically bound phosphate groups. As a result, amylopectin potato starch products in a dissolved state have a distinct polyelectrolyte character.

DETAILED DESCRIPTION OF THE INVENTION

The invention contemplates an adhesive composition based on derivatives of cereal or fruit starches on the one hand, and derivatives of root or tuber starches on the other hand. Waxy maize starch is a cereal starch that may be suitably used. In general, however, root and tuber starches are more preferred. As has been indicated above, it is advantageous to use a starch having a very low content of lipids and/or proteins. Also, the use of a root or tuber starch in leads to an adhesive composition with a highly desirable viscosity profile. The use of amylopectin potato starch and amylopectin tapioca starch has been found to lead to a particularly advantageous adhesive composition.

The derivative of the starch on which an adhesive composition in accordance with the invention is based, is obtainable by crosslinking, etherification, or esterification of the starch, or a combination of two or more of said modifications. These modifications may be performed in any known manner. Examples of suitable manners for obtaining the desired derivatives are for instance disclosed in "Modified Starches: Properties and Uses", O. B. Wurzburg, CRC Press Inc., 1987.

In a crosslinking reaction, the starch is treated with a reagent, a crosslinking agent, having two or more reactive groups. The crosslink agent is preferably attached to the starch via ester and/or ether linkages. Examples of suitable reactive groups are anhydride, halogen, halohydrin, epoxide or glycidyl groups, or combinations thereof. Epichlorohydrin, sodium trimetaphosphate, phosphorous oxychloride, phosphate salts, chloroacetic acid, adipic anhydride, dichloroacetic acid, and combinations thereof have been found to be suitable for use as crosslinking agents.

Etherification of starch may be performed with reagents containing a halo, halohydrin, epoxide or glycidyl group as reactive site. During etherification, a hydroxyalkyl, cationic and/or anionic group can be introduced in the starch.

The alkyl chain of a hydroxyalkylating agent may vary from 1–20 carbon atoms, preferably from 1–12 carbon atoms, more preferably from 1–4 carbon atoms. Examples of suitable hydroxyalkylating agents include ethylene oxide, propylene oxide, butylene oxide, allyl glycidyl ether, propyl glycidyl ether, butyl glycidyl ether, and combinations thereof. Preferably, propylene oxide is used to hydroxyalkylate the starch.

For the introduction of a cationic group, the starch is preferably reacted with a 3-chloro-2-hydroxypropyltrialkyl ammonium, glycidyltrialkylammonium, or chloroethyl-di (cyclo)alkyl ammonium compound. The (cyclo-)alkyl group of the ammonium group can vary from 1–20 carbon atoms, preferably from 1–4 carbon atoms. Suitable examples of reagents for introducing cationic groups include 3-chloro-2-hydroxypropyltrimethyl ammonium salts, glycidyltrimethyl ammonium salts, 3-chloro-2-hydroxypropyldimethylallyl ammonium salts, 3-chloro-2-hydroxypropylmethyldiallyl ammonium salts, chloroethyldiethyl ammonium salts, chloroethyldimethyl ammonium salts, and combinations thereof. The nature of the counterion of the listed ammonium salts is not critical. Often, chloride will be the counterion.

Anionic substituents attached to the starch via an ether linkage can be introduced on the starch molecule by reaction with a chlorocarboxylic acid, for example chloroacetic acid or chloroacetic acid salts, a 3-chloro-2-hydroxypropylsulfonate salt, for example sodium 3-chloro-2-hydroxypropylsulfonate.

Esterification of the starch leads to the introduction of alkyl and/or anionic substituents on the starch. The alkyl group can, for instance, be an acetate or propionate group. Anionic substituents attached to the starch via an ester linkage may be obtained by reaction of the starch with (alkyl)succinic anhydrides or phosphate salts, for example sodium tripolyphosphate.

In case two or more of the above described modifications of the starch are carried out, these reactions may performed simultaneously or in any subsequent order. Preferably, they are performed simultaneously.

All three reactions, the crosslinking, etherification, and esterification of amylopectin starch, may be performed under dry reaction conditions, in suspension (water or organic solvent), in aqueous solution (dispersion), or during the gelatinization of the starch granules. Preferably, the modifications are performed in an aqueous suspension or aqueous solution. The reactions in aqueous solution are preferably performed with less than 80, more preferably between 20 and 60 percent by weight of water in the reaction system. The reactions may suitably be carried out in an autoclave in combination with a dryer (drum dryer; spray dryer), static mixer or extruder.

Preferably, the modifications are optimized to obtain a starch derivative having a high viscosity. The degree of substitution (DS) of the ester or ether groups, which is defined as the molar ratio between the number of substituted hydroxyl groups of a glucose unit and the number of glucose unites in the starch, will depend on the combination of reagents applied and on the desired application properties.

Preferably, the starch is at least crosslinked. Preferred starch derivatives are those which are crosslinked using epichlorohydrin, and further derivatized by one or more of carboxymethylation, hydroxypropylation, or reaction with 3-chloro-2-hydroxypropyltrimethylammonium chloride, in reactions performed in aqueous solution. A further preferred starch derivative is both crosslinked using sodium trimetaphosphate, and acetylated using acetic anhydride, in reactions performed in aqueous suspension.

A preferred class of starch derivatives on which an adhesive composition according to the invention may be based, is formed by the above starch derivatives which have a neutral pH. These starch derivatives have the advantage of a low sensitivity to the presence of salts, e.g. in hard water. Further, they may very conveniently be handled as they are not corrosive to, e.g., human skin.

One of the surprising advantages of the invention is that in order to obtain a suitable derivative of the starch having a high amylopectin content, only small amounts of reagent are necessary. This advantages is especially apparent when the starch derivative is a carboxymethylated starch derivative. As the above described crosslinking, etherification and esterification modifications of the starch often lead to the formation of salt by-products, this leads to an adhesive composition comprising only small amounts of salts. This is particularly advantageous in that the presence of salts may lead to staining of the wallpaper that is being adhered to a surface using the adhesive composition.

In a possible embodiment, an adhesive composition according to the invention also comprises one or more conventional additives, such as cellulose derivatives, in particular methylcellulose and carboxymethylcellulose, polymers, in particular polyvinylacetate, guar gum and xatnhan gum, and cold-soluble starch derivatives, such as oxidized starches or dextrins. These additives may be used to regulate the adhesive strength of the adhesive composition. The cellulose derivatives may be present in amounts ranging from 2.5–95 wt. %, preferably 5–25 wt., based on the adhesive composition. The polymers and other starch derivatives may be present in amounts below 25 wt. %, preferably in amounts ranging from 5–15 wt. %, based on the adhesive composition.

In the preparation of an adhesive composition according to the invention, the starch derivative, obtained as described above, is mixed together with any other desired ingredients and water to form a mixture which contains from about 30 to about 80 wt. % of water. The resulting mixture is preferably dried in a thin layer on a surface by heating to 80 to 200° C. In a preferred embodiment, the mixture is dried for about 2 to 60 seconds, and preferably from about 5 to 25 seconds, at a temperature in the range from 100 to 160° C. The drying process, which preferably takes place in a thin layer is not critical, but is preferably carried out on rollers or a belt dryer, the drying energy being supplied in the form of steam, infra-red heat or microwaves. After drying, the adhesive composition is preferably subjected to one or more of the treatments of grounding, sifting, agglomerating, compacting, granulating, and the like to influence the dissolving behavior.

In order to use an adhesive composition according to the invention for e.g. applying paper to a substrate, the composition can in the conventional way be formulated into a dispersion in water. It has been found that the present adhesive formulation can be very conveniently dispersed in water.

Suitable substrates for applying paper to using the present adhesive composition are stone or wooden materials, such as walls. It will be understood that the adhesive composition may be of use for adhering many paper and cardboard materials to a substrate. A preferred class of paper is formed by wallpaper, including wallpapers which are based on synthetically prepared, polymeric materials, such as vinyl based wallpapers. The skilled person will be aware of the typical requirements of the adhesive composition for particular application. The minimal required adhesive strength, for instance, will depend on the type of wallpaper and on the substrate to which the wallpaper is to be adhered. For most multi-purpose adhesive compositions, an adhesive strength of at least 25 cN/cm will suffice.

The invention will now be elucidated by the following, non-restrictive examples.

EXAMPLE I

Preparation of Wallpaper Adhesives

The following wallpaper adhesives were prepared according to standard methods (see for example: Modified starches: properties and uses' ED. O.B. Wurzburg, CRC Press, Inc. 1987; or U.S. Pat. No. 5,087,649).

A: Crosslinked, carboxymethylated wallpaper adhesives were prepared in aqueous dispersion by a reaction of amylopectin potato starch with a combination of epichlorohydrin (ECH; 0.0005–0.05 w/w% based on dry starch) to crosslink and chloroacetic acid sodium salt (CM; 0.05–1.5 mole per mole dry starch) to carboxymethylate the starch. The reaction was performed in the presence of sodium hydroxide (1.01–1.10 mole per mole chloroacetic acid sodium salt).

B: Crosslinked, carboxymethylated, hydroxypropylated wallpaper adhesives were prepared in dispersion by a reaction of amylopectin potato starch with a combination of epichlorohydrin (ECH; 0.0005–0.05 mole per mole starch) to crosslink, chloroacetic acid sodium salt (CM; 0.05–1.5 mole per mole dry starch) to carboxymethylate, and propylene oxide (HP; 0.05–1.0 mole per mole starch) to hydroxypropylate the starch. The reaction was performed in the presence of sodium hydroxide (1.01–1.10 mole per mole chloroacetic acid sodium salt).

C. Crosslinked, acetylated wallpaper adhesives were prepared in suspension by a reaction of amylopectin potato starch with sodium trimetaphosphate (NaTMP; 0.0005–0.05 mole per mole starch) to crosslink and acetic anhydride ($Ac_2O$; 0.01–0.20 mole per mole starch) to acetylate the starch. The reaction was performed at alkaline pH (8–12.5).

D. Crosslinked, hydroxypropylated, cationic wallpaper adhesives were prepared in solution by a reaction of amylopectin potato starch with sodium trimetaphosphate (NaTMP; 0.0005–0.05 mole per mole starch) to crosslink, propylene oxide (HP; 0.05–1.0 mole per mole starch) to hydroxypropylate and 3-chloro-2-hydroxypropyltrimethyl ammonium chloride (CHPTMAC; 0.005–0.10 mole per mole starch) to cationize the starch. The reaction was performed at alkaline pH (10–13).

EXAMPLE II

Properties of Wallpaner Adhesives

Adhesive strength:

A 200 μm layer of the adhesive dispersion was brought onto beech wood (7 cm×25 cm) using a small rod (Erichsen, model 358). Pieces of cotton (5 cm x 30 cm) were stuck to the beech wood. The samples were dried for 24 hour at 22° C. and 50% humidity. The adhesive strength was measured with a Zwick Materials Testing Machine in cN/cm.

Viscosity Measurements

A certain amount (see below) of product was dissolved in 336 g of water (15° DH) by stirring at, 250 rpm for 5 minutes with an 8-hole blade stirrer. The solution was kept for 30 minutes at 25° C. and subsequently stirred at 250 rpm for 1 minute. The viscosity was measured with a Brookfield RVF viscometer (20 rpm; spindle 5; reading after 1 minute).

A concentration rate of 1:32 (CR=1:32) means that 10.5 g of product was dissolved in 336 g of water.

A concentration rate of 1:24 (CR=1:24) means that 14.0 g of product was dissolved in 336 g of water.

A concentration rate of 1:20 (CR=1:20) means that 16.8 g of product was dissolved in 336.

A concentration rate of 1:10 (CR=1:10) means that 33.6 g of product was dissolved in 336.

The results of the adhesive strength and viscosity measurements are shown in tables 1–3.

TABLE 1

Viscosity and adhesive strength of anionic wallpaper adhesives

| Starch | DS (CM) max[1] | DS (ECH) max[2] | Viscosity (mPa · s.) (CR = 1:32) | Adhesive strength (cN/cm) |
|---|---|---|---|---|
| PS[3] | 0.5 | 0.0065 | 12300 | 35–40 |
| PS[3] | 0.5 | 0.0043 | 12500 | 35–40 |
| PS[3] | 0.5 | 0.0022 | 8100 | 35–40 |
| PS[3] | 0.2 | 0.0065 | 5500 | 35–40 |
| PS[3] | 0.2 | 0.0043 | 7800 | 35–40 |
| PS[3] | 0.2 | 0.0022 | 5700 | 35–40 |
| APS[4] | 0.5 | 0.0065 | 10100 | 35–40 |
| APS[4] | 0.5 | 0.0043 | 13100 | 35–40 |
| APS[4] | 0.5 | 0.0022 | 13600 | 35–40 |
| APS[4] | 0.2 | 0.0065 | 4300 | 35–40 |
| APS[4] | 0.2 | 0.0043 | 7600 | 35–40 |
| APS[4] | 0.2 | 0.0022 | 14300 | 35–40 |

[1]DS (CM) max = Maximum degree of substitution of carboxymethyl groups in mole per mole starch
[2]DS (ECH) max = Maximum degree of substitution of epichlorohydrin in mole per mole starch
[3]PS = Potato Starch
[4]APS = Amylopectin Potato Starch

TABLE 2

Viscosity and adhesive strength of anionic, hydroxypropylated wallpaper adhesives

| Starch | DS (CM) max[1] | DS (ECH) max[2] | DS (HP) max[3] | Viscosity (mPa · s.) (CR = 1:32) | Adhesive strength (cN/cm) |
|---|---|---|---|---|---|
| PS[5] | 0.175 | 0.0043 | 0.26 | 8500 | 45–50 |
| PS[5] | 0.175 | 0.0032 | 0.26 | 9700 | 40–45 |
| PS[5] | 0.175 | 0.0022 | 0.26 | 9600 | 40–45 |
| APS[4] | 0.175 | 0.0043 | 0.26 | 9000 | 45–50 |
| APS[4] | 0.175 | 0.0032 | 0.26 | 13600 | 45–50 |
| APS[4] | 0.175 | 0.0022 | 0.26 | 18500 | 40–45 |

[1]DS (CM) max = Maximum degree of substitution of carboxymethyl groups in mole per mole starch
[2]DS (ECH) max = Maximum degree of substitution of epichlorohydrin in mole per mole starch
[3]DS (HP) max = Maximum degree of substitution of hydroxypropyl groups in mole per mole starch
[4]APS = Amylopectin Potato Starch
[5]PS = Potato Starch

TABLE 3

Viscosity and adhesive strength of non-anionic wallpaper adhesives

| Starch | Crosslink Reagent | Crosslink Dsmax[1] | Ester/Ether Reagent | Ester/Ether Dsmax[1] | CR=[2] | Viscosity mPa · s. | Adhesive strength cN/cm |
|---|---|---|---|---|---|---|---|
| PS[3] | NaTMP | 0.00015 | Ac₂O | 0.10 | 1:22 | 11100 | 35–40 |
| APS[4] | NaTMP | 0.00015 | Ac₂O | 0.10 | 1:24 | 10900 | 30–35 |
| PS[3] | ECH | 0.0022 | HP | 0.75 | 1:20 | 9800 | 35–40 |
| APS[4] | ECH | 0.0011 | HP | 0.75 | 1:23 | 10100 | 30–35 |
| PS[3] | ECH | 0.025 | CHPTMAC HP | 0.042 0.75 | 1:10 | 16500 | 95–100 |
| APS[4] | ECH | 0.025 | CHPTMAC HP | 0.042 0.75 | 1:20 | 16500 | 55–60 |

[1]DSmax = Maximum degree of substitution of epichlorohydrin in mole per mole starch
[2]CR = Concentration rate
[3]PS = Potato Starch
[4]APS = Amylopectin Potato Starch

What is claimed is:

1. An adhesive composition comprising a derivative of a starch, wherein said starch is a root or tuber starch comprising at least 95 wt. % of A amylopectin based on dry substance of the starch, wherein said starch is from a plant genetically modified to provide reduced amylose content, and wherein the derivative of said starch is obtained by crosslinking, etherification, esterification, or a combination thereof, of said starch.

2. An adhesive composition according to claim 1, wherein said plant has been genetically modified by one of modification of, deletion of, insertion in, or antisense reversion of, parts of a gene encoding granule-based starch synthase, in said plant.

3. An adhesive composition according to claim 1, wherein the starch is a potato or tapioca starch.

4. An adhesive composition according to claim 1, wherein the derivative of said starch is obtained by i. crosslinking said starch using epichlorohydrin to obtain a derivative of said ii. further derivitizing said derivative obtained in step (i) by carboxmethylation, hydroxypropylation, or reaction with 3-chloro-2-hydroxypropyltrimethylammonium chloride, or combinations thereof.

5. An adhesive composition according to claim 1, wherein the derivative of said starch is obtained by i. crosslinking said starch using sodium trimetaphosphate, and ii. acetylating said starch using acetic anhydride.

6. A dry composition which, when dissolved in water, forms an adhesive composition according to claim 1.

7. A process for preparing an adhesive composition comprising subjecting a starch to a treatment chosen from the group consisting of crosslinking, etherification, esterification or combinations thereof, wherein said starch comprises at least 95 wt. % of amylopectin based on dry substance of the starch, and wherein said starch is from a plant genetically modified to provide reduced amylose content, and whereby a derivative of said starch is obtained.

8. A process according to claim 7, wherein said crosslinking is accomplished using epichlorohydrin or sodium trimetaphospahte as a crosslinking agent.

9. A process according to claim 7, wherein said starch is acetylated, carboxymethylated, hydroxypropylated, reacted with 3-chloro-2-hydroxypropyltrimethylammonium chloride, or a combination thereof.

10. A process according to claim 7, wherein the derivative of said starch is mixed with water to form a mixture, and the resulting mixture is dried in a thin layer on a surface.

11. A method for adhering wallpaper to a substrate comprising treating said wallpaper with an adhesive composition according to claim 1.

12. A method for adhering a billposter to a substrate comprising treating said billposter with an adhesive composition according to claim 1.

* * * * *

UNITED STATES PATENT AND TRADEMARK OFFICE
CERTIFICATE OF CORRECTION

PATENT NO.     : 6,596,860 B1
DATED          : August 5, 2003
INVENTOR(S)    : Kesselmans et al.

It is certified that error appears in the above-identified patent and that said Letters Patent is hereby corrected as shown below:

Column 5,
Line 26, now reads "preferably 5-25 wt.," and should read -- preferably 5-25 wt. %, --.

Column 6,
Line 43, now reads "Properties of Wallpaner Adhesives", and should read -- Properties of Wallpaper Adhesives --.

Column 8,
Line 26, now reads "a derivative of said", and should read -- a derivative of said starch; and --.

Signed and Sealed this

Twenty-eighth Day of October, 2003

JAMES E. ROGAN
*Director of the United States Patent and Trademark Office*